United States Patent
De Poli et al.

(10) Patent No.: US 11,440,622 B2
(45) Date of Patent: Sep. 13, 2022

(54) ACTUATOR DEVICE FOR A BICYCLE GEARSHIFT AND RELATED BICYCLE GEARSHIFT

(71) Applicant: CAMPAGNOLO S.r.l., Vicenza (IT)

(72) Inventors: Luca De Poli, Galliera Veneta (IT); Marco Minto, Mirano (IT)

(73) Assignee: CAMPAGNOLO S.R.L., Vicenza (IT)

( * ) Notice: Subject to any disclaimer, the term of this patent is extended or adjusted under 35 U.S.C. 154(b) by 0 days.

(21) Appl. No.: 17/541,787

(22) Filed: Dec. 3, 2021

(65) Prior Publication Data
US 2022/0194521 A1 Jun. 23, 2022

(30) Foreign Application Priority Data
Dec. 22, 2020 (IT) .......................... 102020000031877

(51) Int. Cl.
*B62M 25/08* (2006.01)

(52) U.S. Cl.
CPC .................................. *B62M 25/08* (2013.01)

(58) Field of Classification Search
CPC .... B62M 9/122; B62M 9/132; B62M 9/1248; B62M 9/1244
USPC .......................................................... 474/82
See application file for complete search history.

(56) References Cited

U.S. PATENT DOCUMENTS

| | | | | |
|---|---|---|---|---|
| 4,507,101 A | * | 3/1985 | Nagano | B62M 9/1244 474/82 |
| 5,470,277 A | * | 11/1995 | Romano | B62M 9/132 474/81 |
| 5,518,456 A | * | 5/1996 | Kojima | B62M 9/1248 474/82 |
| 5,860,880 A | * | 1/1999 | Oka | B62M 9/1242 474/82 |
| 6,997,835 B2 | * | 2/2006 | Fukuda | B62M 9/1242 474/82 |
| 7,442,136 B2 | * | 10/2008 | Ichida | B62M 9/132 474/82 |

(Continued)

FOREIGN PATENT DOCUMENTS

| | | |
|---|---|---|
| DE | 10 2013 004966 A1 | 4/2014 |
| EP | 2 093 140 A1 | 8/2009 |
| EP | 1 424 275 B1 | 3/2010 |

OTHER PUBLICATIONS

Italian Search Report and Written Opinion in Italian Application No. 102020000031877, dated Aug. 23, 2021 with English translation.

*Primary Examiner* — Henry Y Liu
(74) *Attorney, Agent, or Firm* — Volpe Koenig

(57) ABSTRACT

An actuator device for a bicycle gearshift includes an actuation linkage, a drive member configured to control the deformation of the actuation linkage and comprising a motion transmission element having a rotation axis (X), and a fastening/release mechanism operatively arranged between the motion transmission element and a connection rod of the actuation linkage. The fastening/release mechanism has a first member rotatable about the rotation axis (X) as a unit with said motion transmission element, a second member rotatable about the rotation axis (X) together with said connection rod, an elastic element operatively arranged between the first member and the second member and that exerts a predetermined pre-load stress on the first member and on the second member.

15 Claims, 8 Drawing Sheets

(56) References Cited

U.S. PATENT DOCUMENTS

| | | | | |
|---|---|---|---|---|
| 7,892,122 B2 * | 2/2011 | Fukuda | ............... | B62M 9/122 |
| | | | | 474/82 |
| 7,942,768 B2 * | 5/2011 | Takamoto | ............ | B62M 9/122 |
| | | | | 474/82 |
| 8,066,597 B2 * | 11/2011 | Sakaue | ............... | B62M 9/122 |
| | | | | 474/82 |
| 8,974,331 B2 * | 3/2015 | Yamaguchi | ............ | B62M 25/08 |
| | | | | 474/82 |
| 9,303,763 B2 * | 4/2016 | Yamaguchi | ............ | B62M 9/122 |
| 9,676,444 B2 * | 6/2017 | Shipman | ............... | B62M 25/08 |
| 10,442,498 B2 * | 10/2019 | Pasqua | ............... | B62M 9/1342 |
| 2002/0025868 A1 * | 2/2002 | Fukuda | ............... | B62M 9/122 |
| | | | | 474/70 |
| 2013/0090195 A1 * | 4/2013 | Yamaguchi | ............ | B62K 23/02 |
| | | | | 474/80 |
| 2014/0162817 A1 * | 6/2014 | Yamaguchi | ............ | B62M 9/122 |
| | | | | 474/80 |
| 2016/0288878 A1 * | 10/2016 | Shipman | ............... | B62M 9/122 |
| 2017/0320541 A1 * | 11/2017 | Pasqua | ............... | B62M 9/1342 |
| 2018/0229804 A1 * | 8/2018 | Minto | ............... | B62M 9/135 |
| 2019/0023351 A1 * | 1/2019 | Tsai | ............... | B62M 9/122 |

\* cited by examiner

ACTUATOR DEVICE FOR A BICYCLE GEARSHIFT AND RELATED BICYCLE GEARSHIFT

CROSS REFERENCE TO RELATED APPLICATION

This application claims the benefit of Italian Patent Application No. 102020000031877, filed on Dec. 22, 2020, which is incorporated herein by reference as if fully set forth.

FIELD OF INVENTION

The present invention relates to an actuator device for a bicycle gearshift, as well as to a bicycle gearshift comprising such an actuator device.

Preferably, the bicycle is a racing bicycle

BACKGROUND

In this description and in the claims, the gearshift which is referred to can, without distinction, be the rear one (which is the one shown as a non-limiting example in the attached figures), which moves the chain among the different sprockets of the sprocket assembly associated with the rear wheel of the bicycle, or the front one, which moves the chain among the different crowns of the crankset associated with the crank arms. The movement of the chain is typically actuated through the movement of a derailleur associated with an actuation linkage. The actuation linkage includes a first body associated with the frame of the bicycle, a second body associated with the derailleur and a pair of articulating connection rods that connect the first body and the second body.

For some time, motor-actuated bicycle gearshifts have been commercialized, wherein the movement of the derailleur takes place through a suitably controlled, typically electrically, drive member.

In the development of gearshifts, a great deal of attention has been paid to the quality of the actuation, meaning the ability of the gearshift to carry out the gearshifting operations quickly and precisely.

However, in normal use the performance of a gearshift can be compromised by impacts undergone by the gearshift itself, due for example to the bicycle falling or even only to the loading, unloading and transportation maneuvers on a vehicle. A particularly severe impact can in the most serious cases cause some members of the gearshift to break; less severe impacts can, on the other hand, cause small deformations or even only small mutual movements of the members of the gearshift, often not immediately apparent to the eye, but still such as to compromise the precision and therefore the proper operation of the gearshift. Deformations or mutual movements can in other cases be determined in the gearshifting operation by temporary blocking of the linkage with respect to the drive member, as sometimes happens as a result of mechanical interference between the chain and the sprockets (particularly when passing from one sprocket to another sprocket having a greater diameter).

Therefore, actuator devices have been developed that are provided with protection systems configured to protect the gearshift against undesired temporary deformations/movements or impacts. Such undesired temporary deformations/movements or impacts are, for the sake of brevity, indicated hereinafter with the expression "excess stresses".

U.S. Pat. No. 8,066,597 describes an actuator device for a motorized gearshift in which, in order to provide protection against possible excess stresses, a fastening/release mechanism is provided between the inner articulating connection rod of the actuation linkage and the motion transmission shaft of the motor, which is fixedly connected to the first body of the linkage. Such a fastening/release mechanism comprises a driving member, a driven member and a torsion spring that pushes the driven member against the driving member. The driving member is fixedly connected to the shaft of the motor, whereas the driven member is associated with the inner articulating connection rod of the actuation linkage and is defined substantially by a first-order lever pivoted at a fulcrum pin fixedly connected to the inner articulating connection rod and arranged parallel to the rotation axis of the motor. The torsion spring acts on an end portion of the lever, whereas an opposite end portion of the lever comprises a tooth that, in normal operating conditions, is housed in a seat formed in the driving member. The torsion spring comprises a central portion, which is arranged coaxially to the rotation pin between the inner articulating connection rod and the second body, a first end portion, which is in contact with the end portion of the lever, and a second end portion, which is in contact with a pre-load adjustment screw, which is housed in a suitable further element associated with the inner articulating connection rod. In the presence of an excess stress, i.e. when a predetermined threshold determined by the pre-load of the torsion spring is exceeded, there is a relative rotation between driven member and driving member and the consequent exit of the tooth of the lever from the seat. The excess stress is thus absorbed by the fastening/release mechanism that makes it possible to release the motion transmission shaft from the actuation linkage. In this way, the excess stress is not transferred to the motion transmission shaft of the motor.

U.S. Pat. No. 8,974,331 describes an actuator device for a motorized gearshift in which a fastening/release mechanism is operatively arranged between the motion transmission shaft of the motor and one of the articulating connection rods of the actuation linkage. Such a fastening/release mechanism is positioned on the outer articulating connection rod, which is divided into two rigidly connected portions. Also in this case, the fastening/release mechanism comprises a driving member, a driven member and a torsion spring that pushes the driven member against the driving member. The driving member is fixedly connected to the shaft of the motor, whereas the driven member is associated with the outer articulating connection rod of the actuation linkage and is defined substantially by a second-order lever pivoted at a fulcrum pin fixedly connected to the outer articulating connection rod and arranged parallel to the rotation axis of the motor. The torsion spring acts on an end portion of the lever, whereas an intermediate portion of the lever comprises a tooth that, in normal operating conditions, is housed in a seat formed in the driving member. The torsion spring comprises a central portion, which is arranged coaxially to a mounting element that connects the two portions of the outer articulating connection rod, a first end portion, which is in contact with the end portion of the lever, and a second end portion, which is in contact with a suitable seat formed in the outer articulating connection rod. In a totally analogous way to the fastening/release mechanism of U.S. Pat. No. 8,066,597, in the presence of an excess stress, i.e. when a predetermined threshold determined by the pre-load of the torsion spring is exceeded, there is a relative rotation between driven member and driving member and the consequent exit of the tooth of the lever from the seat.

The Applicant has observed that the fastening/release mechanisms of the actuator devices described in the aforementioned prior art documents have various drawbacks including that of requiring a large number of components and of occupying a significant amount of space, mainly due to the shape and arrangement of the respective levers that define the respective driven members and to the arrangement of the respective torsion springs.

SUMMARY

The problem at the basis of the present invention is that of providing an actuator device for a bicycle gearshift that is more compact, and also simpler in terms of total number of components, than those described above with reference to the prior art.

The present invention therefore relates broadly to an actuator device for a bicycle gearshift, comprising:

an actuation linkage including a first body configured to be associated with a bicycle frame, a second body configured to be associated with a derailleur of the bicycle gearshift and a pair of articulating connection rods that connect the first body and the second body;

a drive member configured to control the deformation of the actuation linkage and comprising a motor fixedly connected to one of the first body and second body and a motion transmission element configured to be set in rotation by the motor about a rotation axis;

a fastening/release mechanism operatively arranged between said motion transmission element and a connection rod of said pair of connection rods and comprising:

a first member rotatable about the rotation axis as a unit with said motion transmission element;

a second member rotatable about the rotation axis together with said connection rod;

an elastic element operatively arranged between the first member and the second member and that exerts a predetermined pre-load stress on the first member and on the second member;

wherein the fastening/release mechanism is selectively configurable in a fastening operative condition in which the first member is rotatable about the rotation axis as a unit with the second member, and in a release operative condition in which the first member and the second member can rotate with respect to one another about the rotation axis, said fastening operative condition being defined when the fastening/release mechanism is subjected to a stress lower than said predetermined pre-load stress and said release operative condition being defined when the fastening/release mechanism is subjected to a stress greater than said predetermined pre-load stress.

BRIEF DESCRIPTION OF THE DRAWINGS

Further features and advantages of the present invention will become clearer from the following detailed description of preferred embodiments thereof, made with reference to the attached drawings and given for indicating and not limiting purposes. In such drawings.

DETAILED DESCRIPTION

Figure 1:
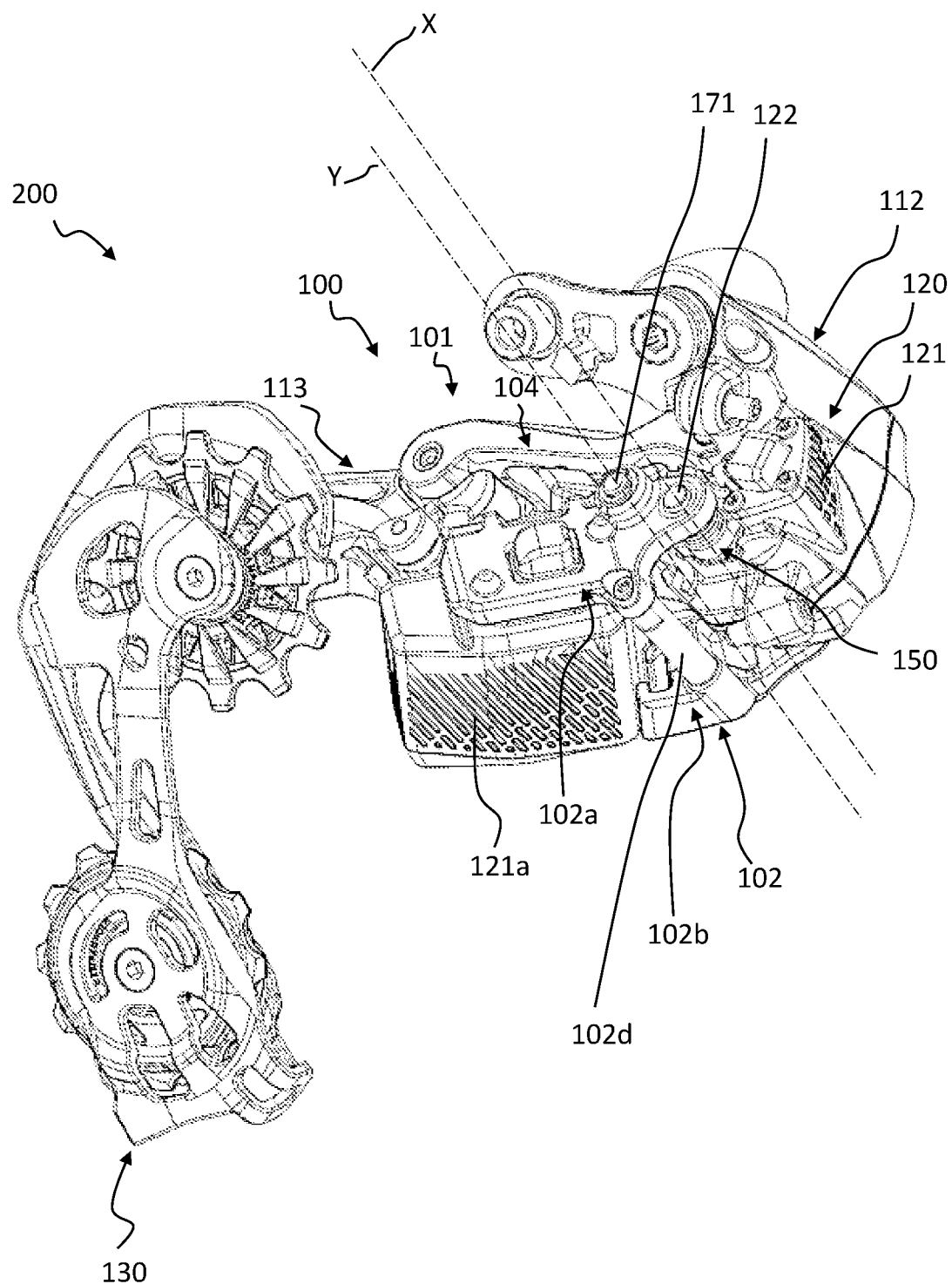
FIG. 1 is a perspective view of a bicycle gearshift in accordance with the present invention, including the actuator device of the invention.

The term "elastic element" is used to generically indicate an element capable of providing an elastic reaction of any kind: torsion, traction, compression, bending. The elastic element can, for example, be a torsion spring.

The expression "pre-load stress" is used to indicate a stress that the elastic element exerts on the first member and on the second member due to the fact that, in the mounted configuration (in particular in the fastening operative condition), it has a different geometry from that taken up in its rest configuration (elastic element dismounted); such a different geometry implies that when the elastic element is in the fastening operative condition it is in a pre-stressed state such as to exert an elastic stress different from zero on the first and second members, which directly influences the "predetermined stress threshold", which will also be indicated hereinafter as "release torque". The elastic element is thus in condition to elastically yield only if the stress discharged onto the elastic element is greater than the predetermined stress threshold value, like in the case of an impact; if, on the other hand, the stress discharged onto the elastic element is lower than the predetermined stress threshold value, like in the case of normal use of the gearshift, the elastic element does not have any yielding. In this last condition, therefore, the elastic element behaves like a substantially rigid body and the its yielding does not interfere with the normal operation of the gearshift.

If it is wished to widen the operating range in which the actuator device readily responds, the threshold stress is advantageously selected to be high. If, on the other hand, it is wished to allow the actuator device to also absorb small impacts, the threshold stress is selected to have a lower value. The value of the threshold stress can easily be determined by suitably sizing the elastic element and/or the first member and/or the second member.

The fastening/release mechanism described above makes it possible to pass from a fastening operative condition in which the connection rod rotates as a unit with the motion transmission element and transfers the motion to the derailleur of the gearshift to a release operative condition in which the connection rod does not rotate as a unit with the motion transmission element and allows a free movement of the connection rod and of the derailleur of the gearshift with respect to the other components of the actuation linkage.

The release operative condition can be activated automatically upon an undesired impact or movement/deformation and can be kept active up to the moment when it is wished the fastening operative condition to be restored. Undesired temporary deformations/movements or impacts of a certain size are thus totally absorbed by the fastening/release mechanism, thus avoiding them to be transmitted to the motion transmission shaft and, consequently, to the drive member.

The release operative condition can also be activated manually before carrying out loading, unloading and transportation maneuvers of the bicycle on a vehicle, or before and after use of the bicycle. The possibility of carrying out manual movement of the actuation linkage also makes it possible to set the desired gear ratio in the case of failure or blocking of the gearshift. In the case of the rear gearshift, it is also possible to make easier the mounting and dismounting operations of the wheel. Indeed, the release can be exploited by the operator to facilitate the engagement of the chain on the sprockets or the disengagement of the chain from the sprockets.

The fastening/release mechanism described above is therefore of the reversible type, i.e. it allows the original operating configuration (i.e. the return to the condition before release) to be restored without leaving residual deformations that could easily disturb the operation of the gearshift and without the need to replace any pieces. Indeed, there is no yielding or breaking of mechanical pieces and it is avoided the use of mechanical pieces that, being free to move without any constraint (since they are broken or no longer held in position), can accidentally strike the members of the gearshift and/or of the bicycle, damaging them.

In the release operative condition, the actuator device keeps its structural integrity, which allows the fastening operative condition to be restored without the need of replacement of pieces.

The positioning of the elastic element between the first member and the second member makes it possible to reduce the space occupied by the actuator device with respect to that of the actuator devices described in the aforementioned prior art documents, where the torsion spring is arranged between the second member and an (inner or outer) articulating connection rod.

Moreover, the actuator device according to the invention comprises a total number of components smaller than that of the actuator devices described in the aforementioned prior art documents. In particular, it is not necessary to provide an element associated with the inner articulating connection rod and in which the pre-load adjustment screw is housed, like for example the one described in U.S. Pat. No. 8,066,597, nor an element that connects the two portions of the outer articulating connection rod and about which the torsion spring is arranged, like for example the one described in U.S. Pat. 8,974,331.

Hereinafter, preferred and/or optional features of the actuator device for a bicycle gearshift according to the present invention are described. Such features can be provided singularly or in combination with each other, unless explicitly stated otherwise.

Preferably, the second member is fixedly connected to a rotation pin rotatably associated with said connection rod. More preferably, such a rotation pin extends along an axis parallel to said rotation axis.

In the release operative condition the second member can rotate with respect to the connection rod about the rotation pin, whereas in the fastening operative condition the second member moves as a unit with the connection rod about the rotation axis.

Preferably, said connection rod comprises:

a first frame having a first hole configured to house a first end portion of the motion transmission element and a second hole configured to house an end portion of the rotation pin;

a second frame fixedly associated with the first frame;

wherein the fastening/release mechanism is operatively arranged between the first frame and the second frame.

The fastening/release mechanism is protected by the first and second frame. The mounting of the fastening/release mechanism is easy and can advantageously be carried out by firstly arranging the first end portion of the motion transmission element and the end portion of the rotation pin in the first and second hole of the first frame.

Preferably, the second member comprises two arms. More preferably, the rotation pin is arranged between the two arms.

The second member thus behaves like a first-order lever.

Preferably, the second member is substantially L-shaped, wherein the two arms of the L (corresponding to the two arms of the second member) can have identical or different length.

Preferably, the two arms are angularly spaced apart from each other by an angle equal to or lower than 90°, so as to reduce the space occupied by the second member.

Preferably, the elastic element is a torsion spring.

Preferably, the torsion spring comprises a central portion arranged coaxially to the rotation pin, a first end portion in contact with the first member and a second end portion in contact with the second member.

The first and second end portions of the torsion spring exert the predetermined pre-load stress (which is equivalent to the release torque), which acts between the first member and the second member.

The Applicant has found that, thanks to the fact that the torsion spring is arranged coaxially to the rotation pin and acts on the first member and on the second member, the release torque is substantially independent from the distance between the axis of the rotation pin and the point of contact with the second member. In the absence of special provisions, the release torque is thus solely a function of the elastic constant of the torsion spring and of the pre-load thereof.

Preferably, one of the first member and second member comprises a torque transfer element and the other of the first member and second member comprises a housing seat configured to house the torque transfer element when the fastening/release mechanism is in the fastening operative condition.

Preferably, the torque transfer element is made in a single piece with the first member or the second member and has a tooth-shaped profile, preferably with a rounded tip.

Alternatively, the torque transfer element can be a cylindrical roller or a ball pivoted to the first member or second member. The radius and the length of the cylindrical roller and the radius of the ball can be suitably sized to establish the value of the threshold stress beyond which the passage from the fastening operative condition to the release operative condition occurs. The use of a cylindrical roller can be advantageous with respect to the use of a ball, in cases in which there are high threshold stresses, since such stresses are distributed along the length of the cylindrical roller, reducing the risk of deformation of the housing seat due to high concentrations of load.

In a first preferred embodiment, the torque transfer element is arranged on one of said two arms and the housing seat is arranged on the first member. Alternatively, the housing seat is arranged on one of said two arms and the torque transfer element is arranged on the first member.

With the same elastic constant of the torsion spring, the release torque (or the predetermined pre-load stress) can be made to depend on other factors, which can be taken into account in the design step or after design is finished.

For example, in the design step, the release torque can be adjusted by changing the distance between the axis of the rotation pin and a contact point of the torque transfer element with the housing seat. Again in the design step, the release torque can be adjusted by changing the geometric configuration of the torque transfer element and/or of the housing seat or by choosing the surface roughness of the torque transfer element and/or of the housing seat.

When the design is finished, the release torque can be adjusted by arranging thicknesses or spacers between the first end portion of the spring and the first member.

Preferably, the other of said two arms comprises a pin in contact with the second end portion of the torsion spring. The contact point between torsion spring and second member is thus arranged on such a pin. Since, as discussed above, the release torque is independent from the distance between the axis of the rotation pin and the contact point between torsion spring and second member, the pin can be arranged close to the rotation pin and, consequently, the length of the arm on which it is arranged can be limited, thereby reducing the space occupied by the second member and, consequently, the actuator device.

Preferably, the first member is coaxial to the rotation axis. Such a provision makes it possible to reduce the space occupied by the first member and, consequently, the actuator device.

In a first preferred embodiment of the actuator device of the present invention, the motion transmission element is defined by a motion transmission shaft of the motor. In this case, preferably, the first member is coaxially fixed to a portion of said motion transmission shaft. Such a portion is preferably grooved, so as to ensure a practical and reliable fixing of the first member on the motion transmission shaft.

Preferably, the first member comprises a substantially cylindrical annular body in contact with the first end portion of the torsion spring and a shaped annular body axially adjacent to the substantially cylindrical annular body.

In a first preferred embodiment, the housing seat is formed in said shaped annular body. Alternatively, the torque transfer element is formed in said shaped annular body.

Advantageously, in the design step, the pre-load stress (and the equivalent release torque) can be adjusted by suitably selecting the diameter of the substantially cylindrical annular body in contact with the torsion spring. For example, the substantially cylindrical annular body can be defined by a washer having a calibrated diameter.

The substantially cylindrical annular body and the shaped annular body can be made in a single piece or in two distinct pieces. In this last case, the substantially cylindrical annular body could also not rotate as a unit with the shaped annular body.

Preferably, the housing seat defines a recessed surface portion between two substantially cylindrical surface portions having equal diameters.

In this way, when passing to the release operative condition, the torque transfer element can slide freely on one of the two substantially cylindrical surface portions.

In the case in which the torque transfer element is a cylindrical roller or a ball, when passing to the release operative condition the roller or ball can rotate freely on the aforementioned substantially cylindrical surface portions.

In a second aspect thereof, the present invention relates to a bicycle gearshift comprising an actuator device according to the first aspect of the present invention discussed above.

Preferably, the aforementioned bicycle gearshift has, singularly or in combination, all of the structural and functional features discussed above with reference to the actuator device of the present invention and therefore makes it possible to achieve all of the advantages and the technical effects mentioned above.

Referring now to the drawings, FIG. 1 indicates at reference numeral 200 a bicycle gearshift in accordance with the present invention. In particular it is a rear gearshift.

The gearshift 200 comprises an actuator device 100, illustrated in detail in FIGS. 2-10.

The actuator device 100 comprises an actuation linkage 101 shaped as an articulated quadrilateral, preferably an articulated parallelogram, configured to be moved by a drive member 120 to move a derailleur 130 (or rocker arm, in the non-limiting example of the rear gearshift).

The actuation linkage 101 comprises a first body 112 (also called upper body) configured to be fixed to a bicycle frame (not illustrated) and in which the drive member 120 is housed, a second body 113 (also called lower body) that supports the derailleur 130 and a pair of articulating connection rods 102, 104 that connect the first body 112 and the second body 113. The connection rods 102, 104 are also respectively called "inner connection rod" and "outer connection rod", with reference to their relative position with respect to the mid-plane of the bicycle.

The drive member 120 controls the deformation of the actuation linkage 101, rotating one of the axes of the articulated quadrilateral (in this particular case the axis X between upper body 112 and the inner connection rod 102). In particular, given that the actuator device 100 is used in a rear gearshift of a bicycle, a counter-clockwise rotation of the inner connection rod 102 with respect to the axis X (in the view of FIG. 1) makes it possible to carry out an upward gearshifting, i.e. a gearshifting towards a more inner toothed wheel of the sprocket assembly, i.e. a toothed wheel having a greater diameter. Vice-versa, a clockwise rotation of the inner connection rod 102 with respect to the axis X (in the view of FIG. 1) allows a downward gearshifting, i.e. a gearshifting towards a more outer toothed wheel of the sprocket assembly, i.e. a toothed wheel having a smaller diameter.

With reference to FIG. 1, the drive member 120 comprises an electric motor 121 fixedly connected to the first body 112 and typically powered and controlled by means of cables and control members not illustrated in the figures.

The drive member 120 also comprises a motion transmission element 122 having a predetermined rotation axis X and set in rotation by the electric motor 121.

The drive member 120 is, as a whole, a gear-motor.

The electric motor 121 is powered by a removable battery 121a that, in the non-limiting example of FIG. 1, is arranged in a suitable seat formed on the inner connection rod 102.

Figure 2:
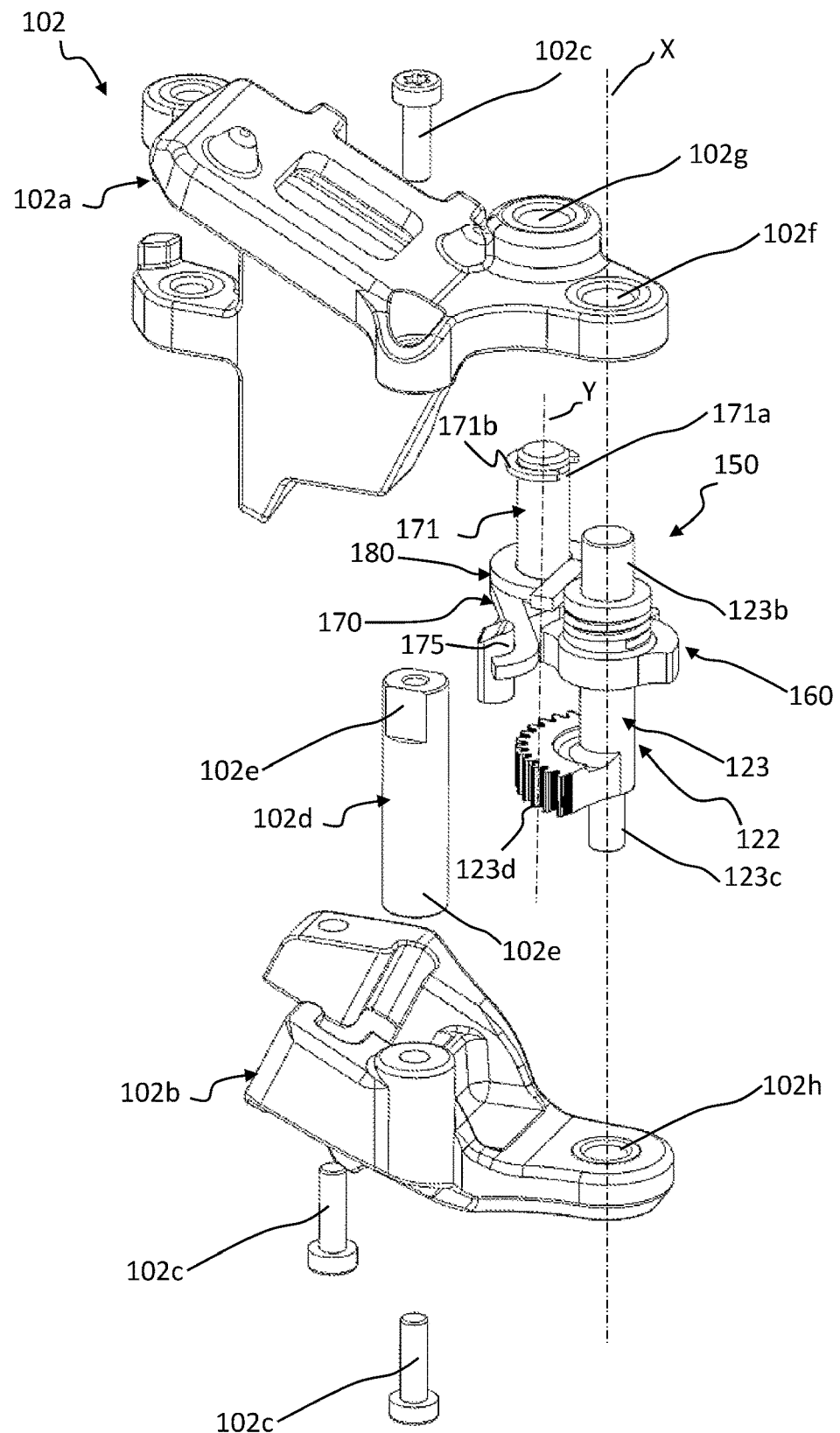
FIG. 2 is an exploded perspective view of a portion of the actuator device of FIG. 1.
Figure 3:
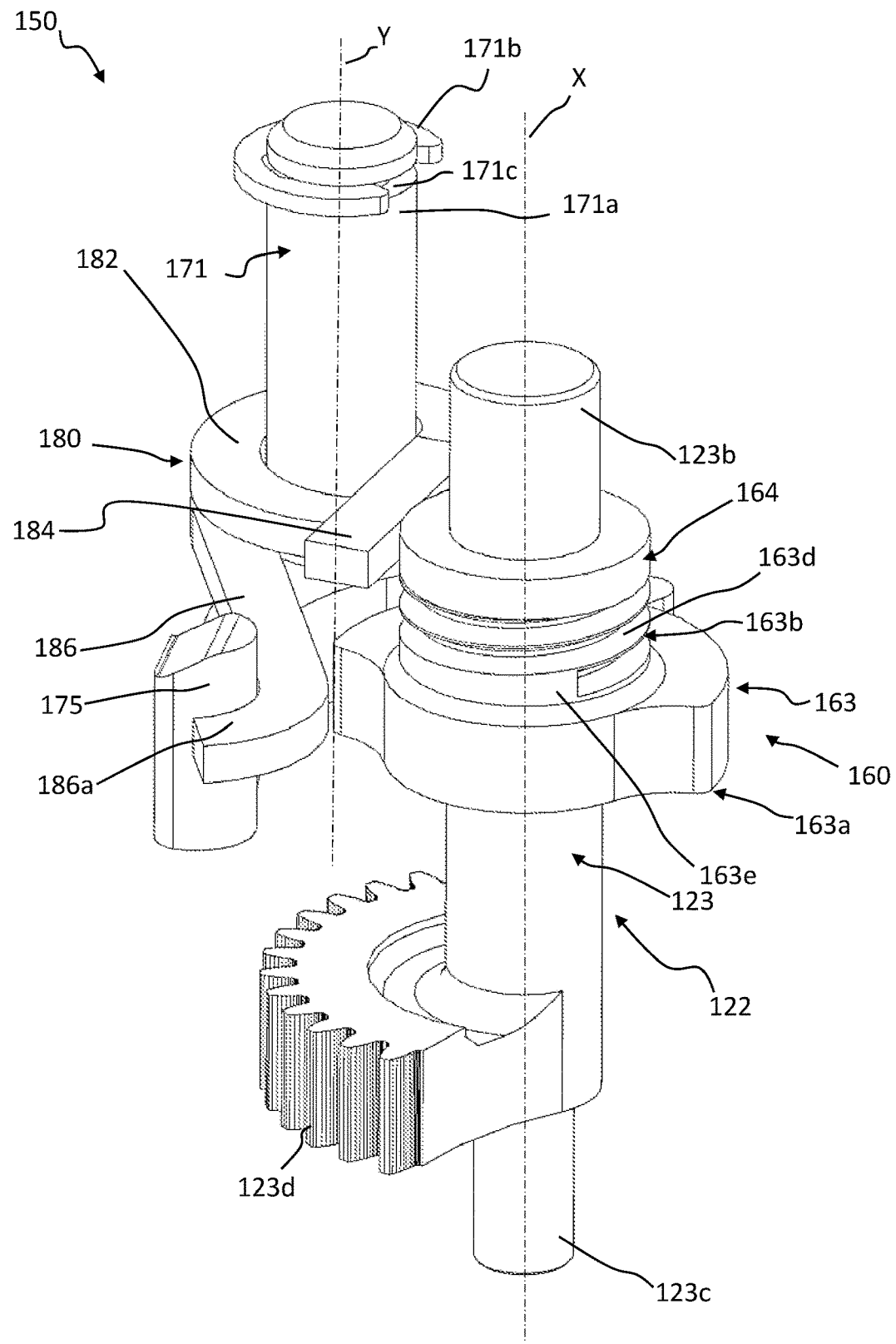
FIG. 3 is an enlarged perspective view of a detail of the actuator device of FIG. 2.
Figure 4:
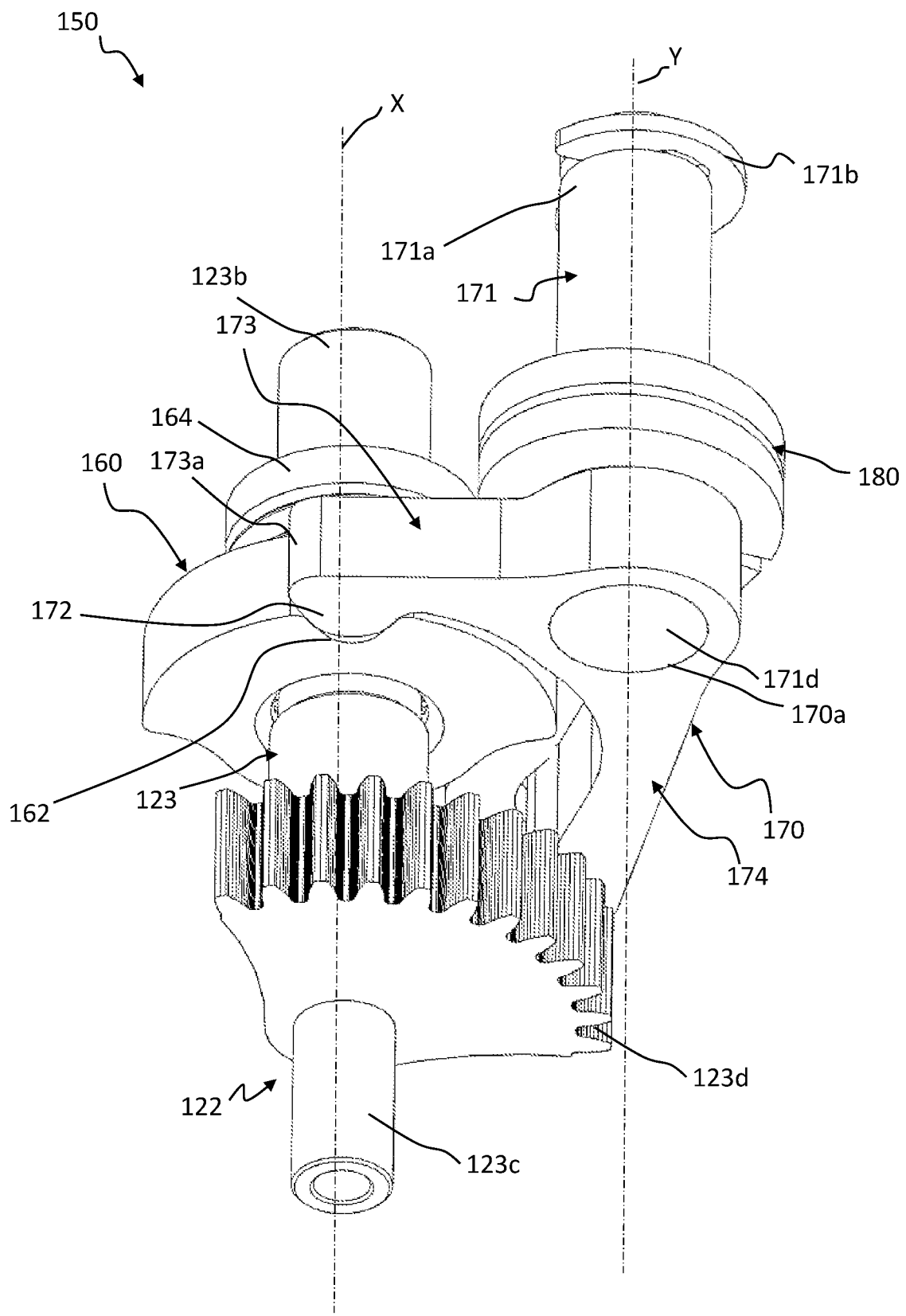
FIG. 4 is a perspective view of the detail of FIG. 3, seen from another point of view.

The motion transmission element 122 defines a motion transmission shaft 123 of the electric motor 121 (FIG. 2).

A fastening/release mechanism 150 is operatively arranged between the motion transmission element 122 and the inner connection rod 102.

The fastening/release mechanism 150 is selectively configurable in a fastening operative condition and in a release operative condition.

In the fastening operative condition the connection rod 102 rotates as a unit with the motion transmission element 122, whereas in the release operative condition the connection rod 102 does not rotate as a unit with the motion transmission element 122.

The fastening operative condition is defined when the actuator device 100 is subjected to a stress lower than a predetermined stress threshold, whereas the release operative condition is defined when the actuator device 100 is subjected to a stress greater than the predetermined stress threshold.

In the specific case described herein, the predetermined stress threshold is a torque having a value greater than a threshold value. Such a torque is herein called release torque.

As illustrated in FIG. 2, the fastening/release mechanism 150 comprises a first member 160 rotating as a unit with the motion transmission element 122 and a second member 170 associated with the connection rod 102.

The first member 160 is coaxial to the rotation axis X and is rotatable about the latter.

The second member 170 is rotatable about the rotation axis X together with the connection rod 102, as explained hereinafter.

Figure 5:
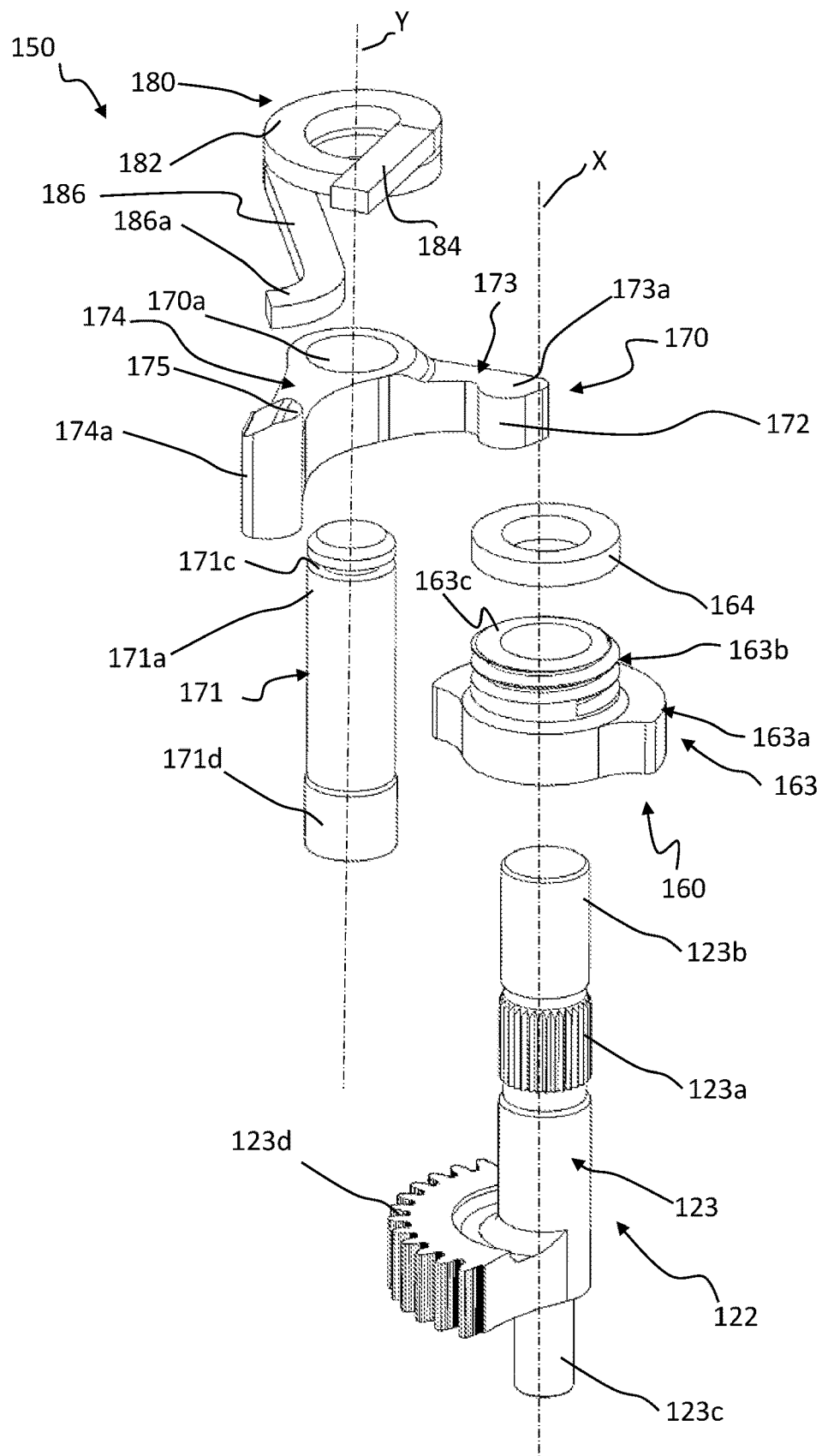
FIG. 5 is an exploded perspective view of the detail of FIG. 3.

The first member 160 is fixed to a grooved portion 123a of the motion transmission shaft 123 (FIG. 5). The first member has a cylindrical inner surface configured to couple with that of the motion transmission shaft 123 through mechanical interference.

The second member 170 is fixedly connected to a rotation pin 171 extending along an axis Y substantially parallel to the rotation axis X and rotatably associated with the connection rod 102.

As illustrated in the non-limiting example of FIG. 2, the connection rod 102 comprises a first frame 102a and a second frame 102b fixedly associated with one another.

In particular, the first frame 102a and the second frame 102b are associated through opposite fixing screws 102c.

A spacer element 102d is arranged between the first frame 102a and the second frame 102b.

The spacer element 102d is substantially cylinder-shaped and is fixed, at opposite end portions 102e thereof, to the first frame 102a and to the second frame 102b through the aforementioned fixing screws 102c.

The spacer element 102d defines a housing interspace of the fastening/release mechanism 150 between the two frames 102a, 102b.

The first frame 102a comprises a first hole 102f configured to house a first end portion 123b of the motion transmission shaft 123 and a second hole 102g configured to house an end portion 171a of the rotation pin 171.

The motion transmission shaft 123 is free to rotate in the first hole 102f and the rotation pin 171 is free to rotate in the second hole 102g.

The first hole 102f illustrated in the non-limiting example of the figures attached herein is a through hole, but it could also be a blind hole.

The second hole 102g is a through hole.

The part of the first end portion 171a of the rotation pin 171 that, once the first frame 102a has been passed through, is arranged on the opposite side with respect to the second frame 102b has a circumferential seat 171c in which an elastic ring 171b is housed, so as to axially lock the rotation pin 171 with respect to the first frame 102a.

The second frame 102b comprises a third hole 102h configured to house a second end portion 123c of the motion transmission shaft 123 or an end of a pin (not illustrated) coaxial to the rotation axis X, physically distinct from the motion transmission shaft 123 and rotating as a unit with the latter. The third hole 102h illustrated in the non-limiting example of the figures attached herein is a through hole, but it could also be a blind hole. The motion transmission shaft 123, or the aforementioned pin, is free to rotate in the third hole 102h.

As illustrated in the non-limiting example of FIG. 5, the grooved portion 123a of the motion transmission shaft 123 is more adjacent to the first end portion 123b than to the second end portion 123c of the motion transmission shaft 123.

The motion transmission shaft 123 comprises, between the grooved portion 123a and the second end portion 123c, a gear 123d configured to receive the rotary motion from the drive member 120 and to impart it to the motion transmission shaft 123.

An elastic element 180 is operatively arranged between the first member 160 and the second member 170. The elastic element 180 exerts a predetermined pre-load stress on the first member 160 and on the second member 170, which directly influences the release torque.

In the non-limiting example illustrated in the figures, the elastic element 180 is a torsion spring.

The torsion spring comprises a central portion 182 arranged coaxially to the rotation pin 171, a first end portion 184 in contact with the first member 160 and a second end portion 186 in contact with the second member 170.

The two end portions 184, 186 of the torsion spring comprise respective rectilinear segments. In the specific embodiment illustrated herein, the end portion 186 has a curved end segment 186a.

In the fastening operative condition, i.e. when the fastening/release mechanism 150 is subjected to a stress lower than the predetermined pre-load stress, the first member 160 is rotatable about the rotation axis X as a unit with the second member 170. The latter sets the rotation pin 171 and thus the connection rod 102 in rotation about the rotation axis X.

In the release operative condition, i.e. when the fastening/release mechanism 150 is subjected to a stress greater than the predetermined pre-load stress, the first member 160 and the second member 170 can rotate with respect to one another about the rotation axis X.

The second member 170 comprises two arms 173 and 174 and a hole 170a arranged between two arms 173,174 (FIG. 5).

The hole 170a illustrated in the attached figures is a through hole, but it could also be a blind hole.

The rotation pin 171 passed through the hole 170a. The rotation pin 171 is fixedly associated with the hole 170a, for example through a coupling with interference or gluing.

The second member 170 thus behaves like a first-order lever, with the fulcrum at the axis Y of the rotation pin 171 and the two arms 173, 174 of the lever.

In particular, the second member 170 is substantially L-shaped, with the two arms of the L defined by the two arms 173 and 174. Such arms can have identical or different length and are angularly spaced from each other by an angle equal to or lower than 90°.

At an end portion 174a of the arm 174 a pin 175 is formed, on which the second end portion 186 makes contact and about which the curved segment 186a of the second end portion 186 of the torsion spring is partially wound.

A torque transfer element 172 is formed at an end portion 173a of the arm 173. The torque transfer element 172 is configured to make the second member 170 rotating as a unit with the first member 160 in the fastening operative condition and to decouple the second member 170 from rotating with the first member 160 in the release operative condition.

The torque transfer element 172 is made in a single piece with the second member 170. As illustrated in the non-limiting example of FIG. 4, the torque transfer element 172 has a tooth-shaped profile, the tip of which is rounded.

The first member 160 comprises a housing seat 162 formed in the first member 160 and configured to cooperate with the torque transfer element 172.

The housing seat 162 houses the torque transfer element 172 when the fastening/release mechanism 150 is in the fastening operative condition, whereas it does not house the torque transfer element 172 when the fastening/release mechanism 150 is in the release operative condition.

In the non-limiting example of FIG. 5, the first member 160 comprises a shaped annular body 163 having a shaped annular portion 163a and a substantially cylindrical annular portion 163b axially adjacent to the shaped annular portion 163a.

The housing seat 162 is formed in the shaped annular portion 163a.

The first member 160 also comprises a substantially cylindrical annular body 164 axially adjacent to the shaped annular body 163 and on which the first end portion 184 of the torsion spring makes contact.

In the example of FIG. 5, the substantially cylindrical annular body 164 is defined by a washer having a calibrated diameter. In the design step, the pre-load stress can be adjusted by suitably selecting the outer diameter of such a washer.

Again in the example of FIG. 5, the substantially cylindrical annular body 164 is coupled with a free end portion 163c of the substantially cylindrical annular portion 163b of the shaped annular body 163.

In particular, the substantially cylindrical annular body 164 rests on the free end portion 163c.

Alternatively, the substantially cylindrical annular body 164 could be fitted onto the substantially cylindrical annular portion 163b of the shaped annular body 163, being arranged in radially outer position with respect to the latter.

In a further alternative, the substantially cylindrical annular body 164 may not be provided. In this case, the first end portion 184 of the torsion spring directly contacts the substantially cylindrical annular portion 163b of the shaped annular body 163.

In the example of FIG. 5, the substantially cylindrical annular body 164 and the shaped annular body 163 are made in two distinct pieces, but they could also be made in a single piece. The shaped annular body 163 is always fixed to the grooved portion 123a of the motion transmission shaft 123, whereas the substantially cylindrical annular body 164 can also be fixed to the grooved portion 123a or may not be fixed to the motion transmission shaft 123 and not rotate as a unit with the shaped annular body 163 about the rotation axis X.

Figure 6:
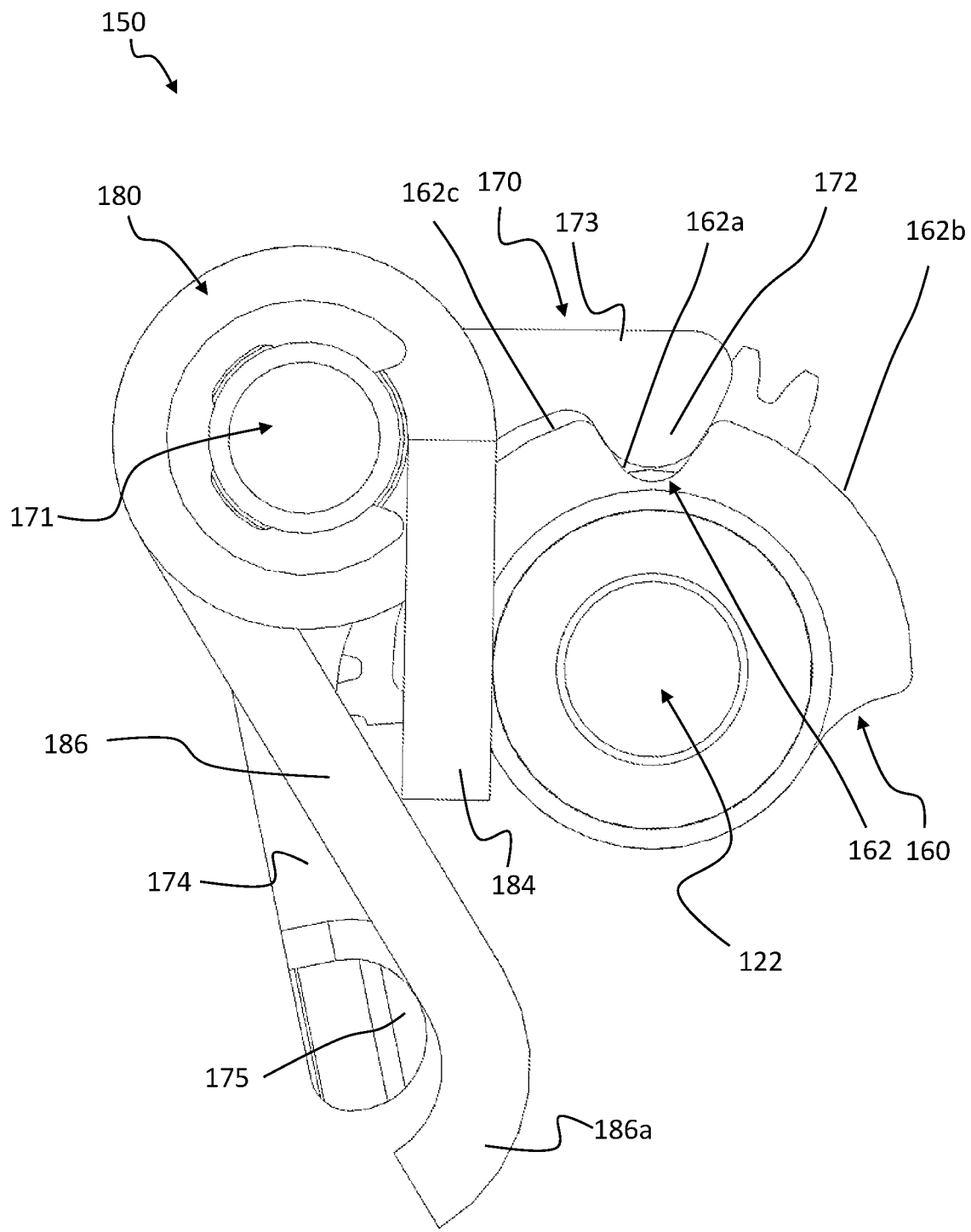
FIG. 6 is a plan view from above of the detail of FIG. 3.

As illustrated in the non-limiting example of FIG. 6, the housing seat 162 defines a recessed surface portion 162a between two substantially cylindrical surface portions 162b, 162c having substantially equal diameter.

In this way, when passing to the release operative condition, the torque transfer element 172 can slide freely on one of the two substantially cylindrical surface portions 162b or 162c.

Preferably, bevelled joining surfaces are provided between the recessed surface portion 162a and each of the two substantially cylindrical surface portions 162b, 162c. In this way, the passage from the fastening operative condition to the release operative condition is facilitated without jamming. The reaction to the undesired movement/deformation or impact is influenced by the geometry of the torque transfer element 172 (in the example illustrated herein, dimensions and radius of the tooth-shaped profile) and by the geometry of the housing seat 162 (in the example illustrated herein, opening angle and depth of the recessed surface portion 162a), as well as by the pre-load of the elastic element 180.

When the actuator device 100 is in the fastening operative condition, shown for example in FIG. 6, the torque transfer element 172 is at least partially housed in the housing seat 162 and allows the transfer of the rotation from the first member 160 to the second member 170. When, on the other hand, the actuator device 100 is in the release operative condition, shown for example in FIGS. 7-10, the torque transfer element 172 is not housed in the housing seat 162 and allows the relative rotation between the first member 160 and the second member 170. The elastic element 180 exerts a pushing action so that, when the actuator device 100 is in the fastening operative condition, the torque transfer element 172 is pushed in the housing seat 162.

In travel, the actuator device 100 is normally in the fastening operative condition. In such an operative condition, the connection rod 102 rotates as a unit with the motion transmission element 122 and transfers the motion to the derailleur 130 of the gearshift. The torque transfer element 172 is housed in the housing seat 162, as illustrated in FIG. 6.

During the various gearshifting operations, the relative position between the first member 160 and the body 112 in which the drive member 120 is housed (and therefore the relative position between derailleur 130 and frame of the bicycle) changes but the relative position between the first member 160 and the second member 170 does not change. The torque transfer element 172 indeed always remains housed in the housing seat 162, as stress values greater than the value of the predetermined stress threshold are not reached.

Upon a manual actuation or a jamming of the gearshift or an impact such as to generate a stress on the gearshift that exceeds the value of the predetermined stress threshold, the torque transfer element 172 exits the housing seat 162 allowing the first member 160 to rotate with respect to the second member 170 (as illustrated in FIGS. 7-10). The actuator device 100 in this case is in the release operative condition.

Figure 7:
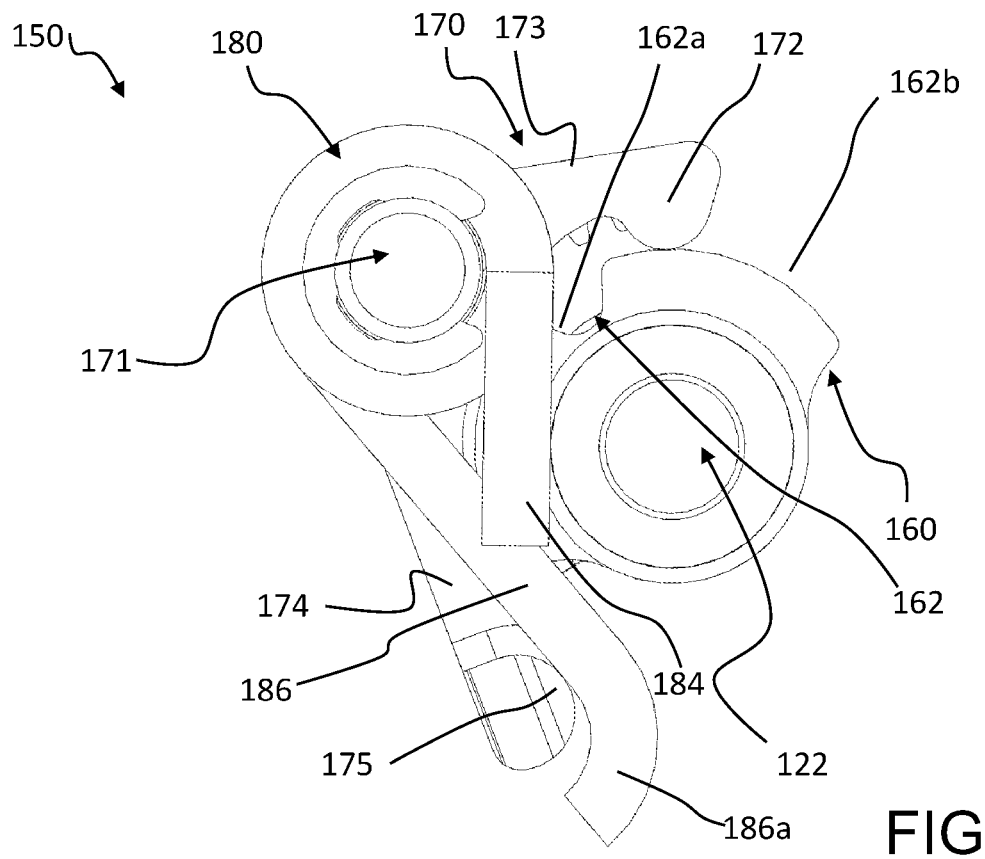
FIGS. 7-10 are plan views of the detail of FIG. 3 in four different operative configurations.
Figure 8:
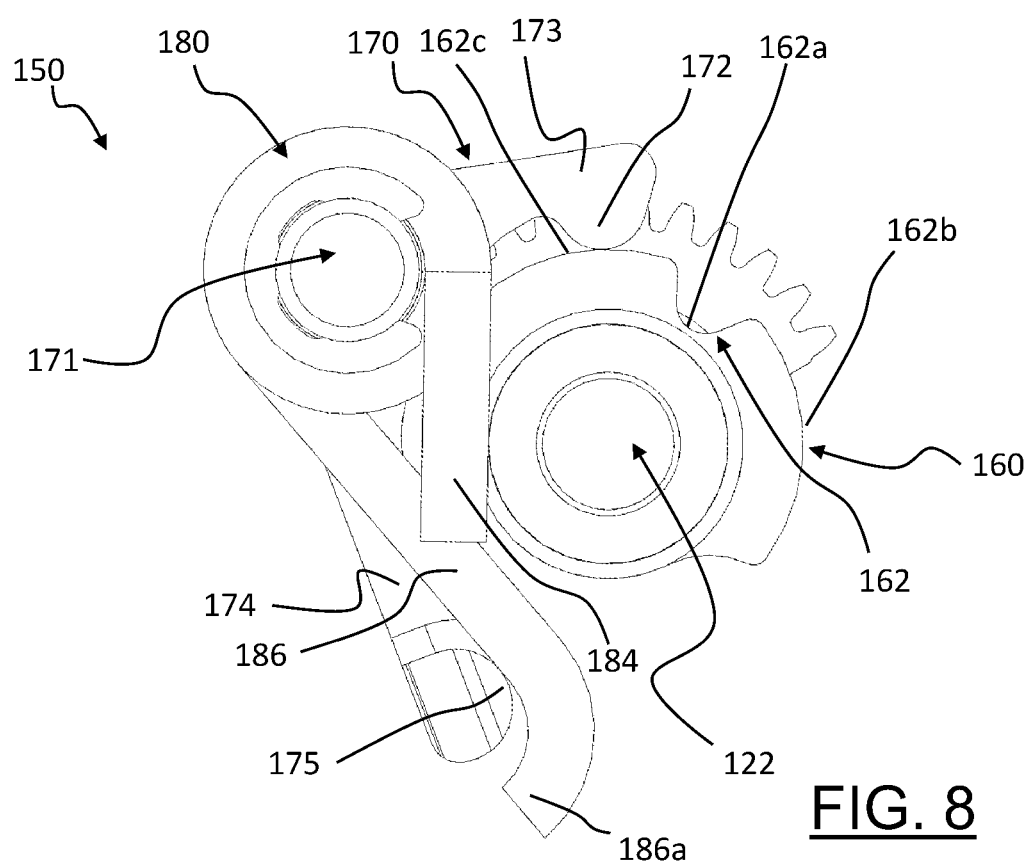

In particular, FIGS. 7 and 8 illustrate the release operative condition of the actuator device 100 in the case of jamming of the actuation linkage 101 while the motion transmission element 122 (and therefore also the first member 160) rotates in the counter-clockwise direction (FIG. 7) or in the clockwise direction (FIG. 8). In such an operative condition the torque transfer element 172 slides freely on one of the two substantially cylindrical surface portions 162b or 162c.

Figure 9:
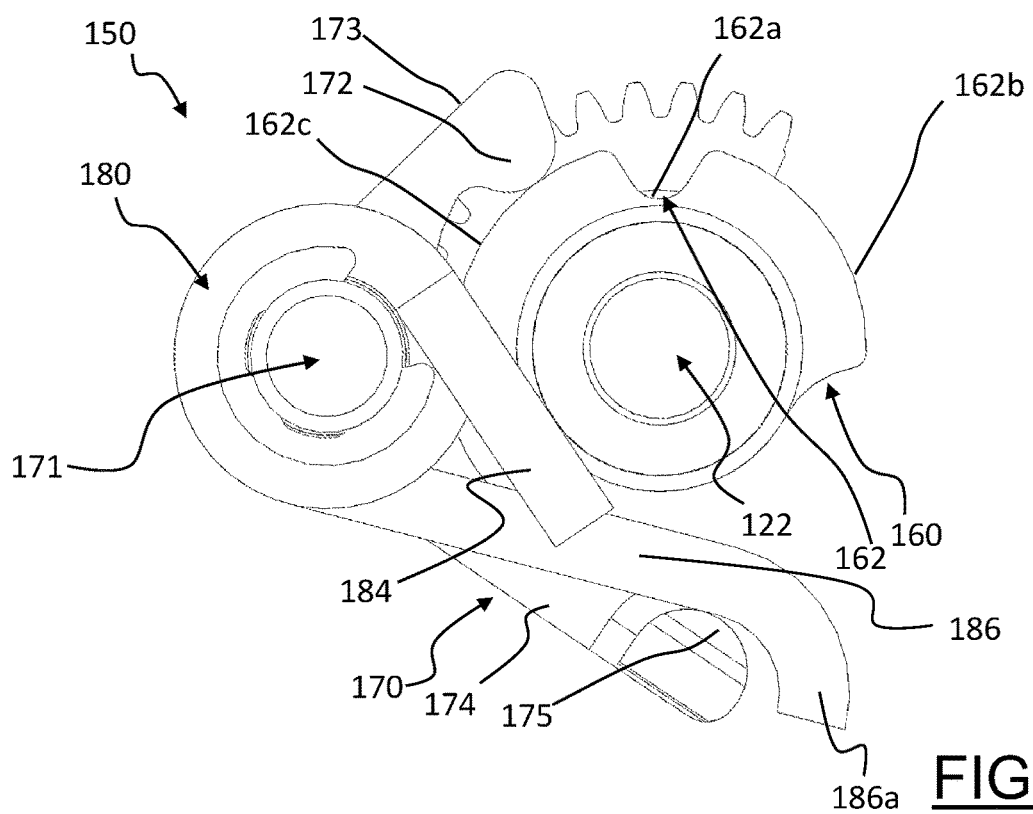
Figure 10:
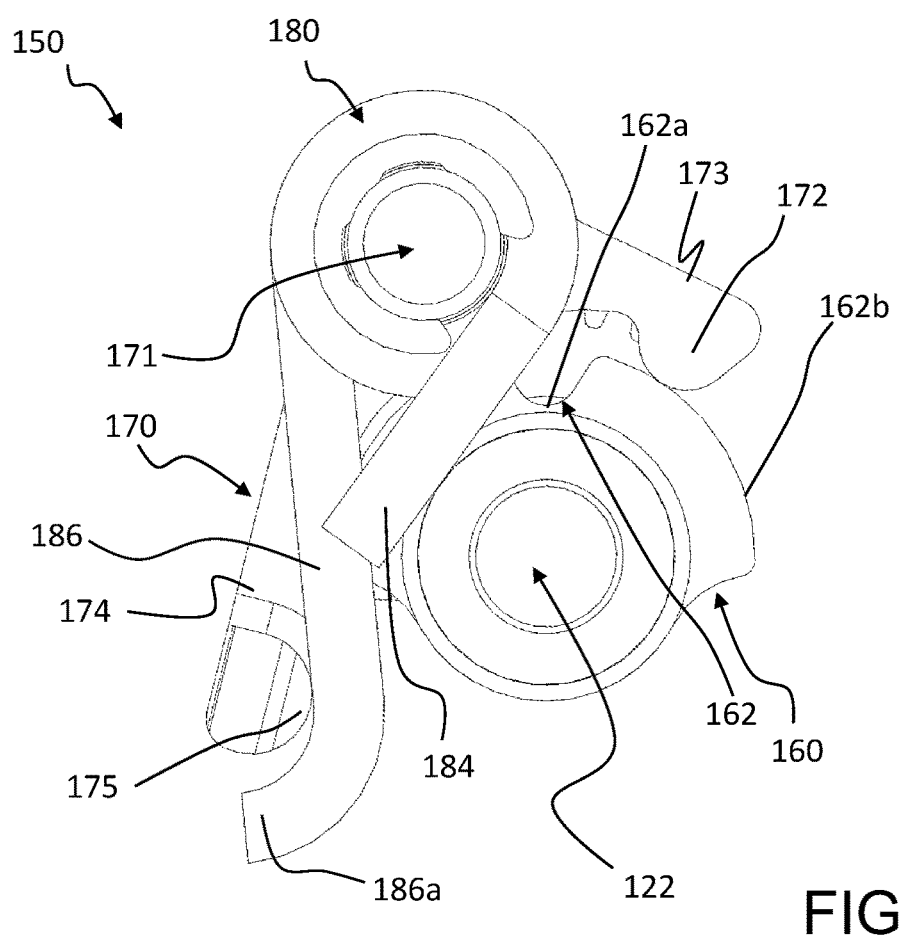

FIGS. 9 and 10 illustrate the release operative condition of the actuator device 100 in the case of an impact on the actuation linkage 101 such as to generate a stress that exceeds the value of the predetermined stress threshold while the motion transmission element 122 is stationary. Depending on the direction of the impact on the actuation linkage 101, the second member 170 can rotate in the counter-clockwise direction (FIG. 9) or in the clockwise direction (FIG. 10), so that the torque transfer element 172 slides freely on one of the two substantially cylindrical surface portions 162c or 162d.

The actuator device 100 is of the rotational type and the fastening/release mechanism 150 is of the rotational and symmetrical type, i.e. the bicycle gearshift 200 can release both when it changes towards the larger sprockets and when it changes towards the smaller sprockets of the sprocket assembly, and it is possible to manually reposition the derailleur 130 aligning it under any sprocket.

From the above description it is clear that the main function of the fastening/release mechanism 150 of the actuator device 100 of the present invention is both that of protecting the gearmotor (gears and motor 121) and the components of the gearshift in the case of external impacts or jamming, and that of allowing the manual selection of the sprocket to be used in the case of failure of the gearshift (for example due to malfunction of the gearmotor) or of exhaustion of energy in the battery 121a, so as to be able to still allow a safe return to home of the cyclist.

Of course, those skilled in the art can bring numerous modifications and changes to the invention described above in order to satisfy specific and contingent requirements, all of which are within the scope of protection defined by the following claims

What is claimed is:

1. An actuator device for a bicycle gearshift, the actuator device comprising:
    an actuation linkage including a first body configured to be associated with a bicycle frame, a second body configured to be associated with a derailleur of the bicycle gearshift and a pair of articulating connection rods that connect the first body and the second body;
    a drive member configured to control the deformation of the actuation linkage and comprising a motor fixedly connected to one of the first body and second body and a motion transmission element configured to be set in rotation by the motor about a rotation axis (X);
    a fastening/release mechanism operatively arranged between said motion transmission element and a connection rod of said pair of connection rods and comprising:
    a first member rotatable about the rotation axis (X) as a unit with said motion transmission element;
    a second member rotatable about the rotation axis (X) together with said connection rod;
    an elastic element operatively arranged between the first member and the second member and that exerts a predetermined pre-load stress on the first member and on the second member;
    wherein the fastening/release mechanism is selectively configurable in a fastening operative condition in which the first member is rotatable about the rotation axis (X) as a unit with the second member, and in a release operative condition in which the first member and the second member can rotate with respect to one another about the rotation axis (X), said fastening operative condition being defined when the fastening/release mechanism is subjected to a stress lower than said predetermined pre-load stress and said release operative condition being defined when the fastening/release mechanism is subjected to a stress greater than said predetermined pre-load stress.

2. The actuator device according to claim 1, wherein the second member is fixedly connected to a rotation pin rotatably associated with said connection rod and extending along an axis (Y) parallel to said rotation axis (X).

3. The actuator device according to claim 2, wherein said connection rod comprises:
    a first frame having a first hole configured to house a first end portion of the motion transmission element and a second hole configured to house an end portion of the rotation pin;
    a second frame fixedly associated with the first frame;
    wherein the fastening/release mechanism is operatively arranged between the first frame and the second frame.

4. The actuator device according to claim 2, wherein the second member comprises two arms and wherein the rotation pin is arranged between the two arms.

5. The actuator device according to claim 4, wherein the second member is substantially L-shaped.

6. The actuator device according to claim 1, wherein the elastic element is a torsion spring.

7. The actuator device according to claim 6, wherein the second member is fixedly connected to a rotation pin rotatably associated with said connection rod and extending along an axis (Y) parallel to said rotation axis (X), and wherein the torsion spring comprises a central portion arranged coaxially to the rotation pin, a first end portion in contact with the first member and a second end portion in contact with the second member.

8. The actuator device according to claim 1, wherein one of the first member and the second member comprises a torque transfer element and the other of the first member and the second member comprises a housing seat configured to house the torque transfer element when the fastening/release mechanism is in the fastening operative condition.

9. The actuator device according to claim 8, wherein the second member comprises two arms and the rotation pin is arranged between the two arms, and wherein the torque transfer element is arranged on one of said two arms.

10. The actuator device according to claim 9, wherein the second member is fixedly connected to a rotation pin rotatably associated with said connection rod and extending along an axis (Y) parallel to said rotation axis (X), and wherein the torsion spring comprises a central portion arranged coaxially to the rotation pin, a first end portion in contact with the first member and a second end portion in contact with the second member, and wherein the other of said two arms comprises a pin in contact with the second end portion of the torsion spring.

11. The actuator device according to claim 1, wherein the first member is coaxial to the rotation axis (X).

12. The actuator device according to claim 11, wherein the second member is fixedly connected to a rotation pin rotatably associated with said connection rod and extending along an axis (Y) parallel to said rotation axis (X), and wherein the torsion spring comprises a central portion arranged coaxially to the rotation pin, a first end portion in contact with the first member and a second end portion in contact with the second member, and wherein the first member comprises a substantially cylindrical annular body in contact with the first end portion of the torsion spring and a shaped annular body axially adjacent to the substantially cylindrical annular body.

13. The actuator device according to claim 12, wherein one of the first member and the second member comprises a torque transfer element and the other of the first member and the second member comprises a housing seat configured to house the torque transfer element when the fastening/release mechanism is in the fastening operative condition, and wherein the housing seat is formed in said shaped annular body.

14. The actuator device according to claim 13, wherein the housing seat defines a recessed surface portion between two substantially cylindrical surface portions having equal diameters.

15. A bicycle gearshift comprising the actuator device according to claim 1.

* * * * *